United States Patent [19]

Maloney

[11] Patent Number: 5,639,962

[45] Date of Patent: Jun. 17, 1997

[54] ENHANCED TIRE UNIFORMITY MACHINE DATA UTILIZING FIRST AND SECOND DERIVATIVE CALCULATIONS

[75] Inventor: John Michael Maloney, Medina, Ohio

[73] Assignee: The Goodyear Tire & Rubber Company, Akron, Ohio

[21] Appl. No.: 611,916

[22] Filed: Mar. 6, 1996

[51] Int. Cl.$^6$ .................................................. G01M 17/02
[52] U.S. Cl. ................................................................ 73/146
[58] Field of Search .................................................. 73/146

[56] References Cited

U.S. PATENT DOCUMENTS

| Re. 28,775 | 4/1976 | Tarpinian et al. | 73/146 |
|---|---|---|---|
| 3,478,581 | 11/1969 | Sperberg | 73/146 |
| 3,500,681 | 3/1970 | Shively | 73/146 |
| 3,550,442 | 12/1970 | Carr et al. | 73/146 |
| 3,563,088 | 2/1971 | Sperberg | 73/146 |
| 3,577,780 | 5/1971 | Sperberg | 73/146 |
| 3,722,270 | 3/1973 | Sperberg | 73/146 |
| 3,894,421 | 7/1975 | Sperberg | 73/146 |
| 3,919,882 | 11/1975 | Wells | 73/146 |
| 4,241,300 | 12/1980 | Hayes et al. | 318/590 |
| 4,258,567 | 3/1981 | Fisher, III | 73/146 |
| 4,402,218 | 9/1983 | Engel | 73/146 |
| 4,404,848 | 9/1983 | Iwama et al. | 73/146 |
| 4,422,336 | 12/1983 | Beebe | 73/146 X |
| 4,805,125 | 2/1989 | Beebe | 364/570 |
| 4,938,056 | 7/1990 | DeRudder et al. | 73/49 |
| 5,313,827 | 5/1994 | Yovichin | 73/146 |
| 5,357,798 | 10/1994 | Weinzerl et al. | 73/146 |
| 5,421,197 | 6/1995 | Ohms | 73/146 |
| 5,502,433 | 3/1996 | Breuer et al. | 73/146 X |

*Primary Examiner*—Richard Chilcot
*Assistant Examiner*—Paul D. Amrozowicz
*Attorney, Agent, or Firm*—David L. King

[57] ABSTRACT

A method for analyzing tire uniformity including a force machine, the method including the steps of measuring radial and lateral forces of a tire, generating radial and lateral waveforms from measurements of the radial and lateral forces of the tire, and calculating the first and second derivatives of the waveforms, preferably using a point-to-point slope calculation. The derivatives may be represented in terms of peak-to-peak pounds force per square seconds, in terms of frequency spectrum, in terms of maximum rate of change, or in terms of root mean squares. The derivatives are then compared to predetermined uniformity specifications, and tires not falling with the specifications are removed. Tangential forces may also be analyzed.

22 Claims, 6 Drawing Sheets

ENHANCED TIRE UNIFORMITY MACHINE DATA UTILIZING FIRST AND SECOND DERIVATIVE CALCULATIONS

BACKGROUND OF THE INVENTION

This invention pertains generally to the art of methods and apparatuses for measuring and analyzing uniformity characteristics of tires, and more specifically to the measurement and analysis of radial and lateral forces using the waveforms of the forces and the first and second derivatives of those waveforms.

Conventional uniformity machine measurements and calculations depict the tire uniformity characteristics in terms of peak-to-peak amplitudes and spectral components for radial, lateral, and tangential forces. Plysteer, conicity, bulge, and valley radial and lateral runouts are also included.

Production tires are screened by uniformity machines, and the measured and calculated information is then compared to original equipment manufacturer's (OEM) specifications for a pass or fail sorting.

Ride testing indicates that its possible for tires to pass all OEM specifications and still cause rough ride and other undesirable vehicle effects.

The peak-to-peak amplitude of the above-mentioned parameters is important, but the rate of change of these parameters is also important. The rate of change of these parameters may be defined by the first and second derivatives with respect to time of these measured parameters.

Peak-to-peak variations may be within specifications, but the rate of change of these parameters can be very localized and cause instantaneous changes in velocity and acceleration. Today's sensitive automobile suspensions can pick up and transmit the localized changes through the vehicle. Additionally, while grinding of the offending tire may lower the peak-to-peak measurements of the above-mentioned parameters, grinding may not eliminate the high rates of change of the forces. In such case the tire may still produce an unacceptable ride.

U.S. Pat. No. Re. 28,775 to Tarpinian et al. discloses the use of force harmonics to mark tires.

U.S. Pat. No. 4,258,567 to Fisher, III is directed to the use of force data to identify sidewall deformity in tires.

U.S. Pat. No. 5,313,827 to Yovichin is directed to the use of runout measurements to identify sidewall deformity in tires.

U.S. Pat. No. 3,894,421 to Sperberg and U.S. Pat. No. 4,938,056 to DeRudder et al. disclose the measurement of pneumatic pressure in tires to detect uniformity problems.

The present invention contemplates a new and improved method for analyzing tire uniformity which is simple in design, effective in use, and overcomes the foregoing difficulties and others while providing better and more advantageous overall results.

SUMMARY OF THE INVENTION

In accordance with the present invention, a new and improved method of analyzing the uniformity of tires is provided which utilizes the first and second derivatives of the radial and lateral force waveforms.

More particularly, in accordance with the present invention, a method for analyzing tire uniformity including a force machine, the method including the steps of measuring radial forces of a tire and measuring lateral forces of a tire. The method further includes the steps of creating a radial waveform from measurements of the radial forces of the tire, creating a lateral waveform from measurements of the lateral forces of the tire, calculating a first derivative of the radial waveform, calculating a first derivative of the lateral waveform, calculating a second derivative of the radial waveform, and calculating a second derivative of the lateral waveform.

According to one aspect of the present invention, the derivatives are calculated using a point-to-point slope calculation.

According to another aspect of the invention, the method further includes the steps of comparing the first derivative of the radial waveform to predetermined specifications, comparing the second derivative of the radial waveform to predetermined specifications, comparing the first derivative of the lateral waveform to predetermined specifications, and comparing the second derivative of the lateral waveform to predetermined specifications.

One advantage of the present invention is the ability to analyze and recognize tire non-uniformity that is undetected by peak-to-peak force calculations.

Another advantage of the present invention is the ability to recognize tires that can yield an unacceptable ride despite being within uniformity peak-to-peak force specifications.

Another advantage of the present invention is the ability to use existing force machines with only minor modifications in data analysis.

Another advantage of the present invention is to expose tire abnormalities such as tread splices, ply splices, mold non-uniformities, mold runout, and tread pattern effects that are indistinguishable in force data sets.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
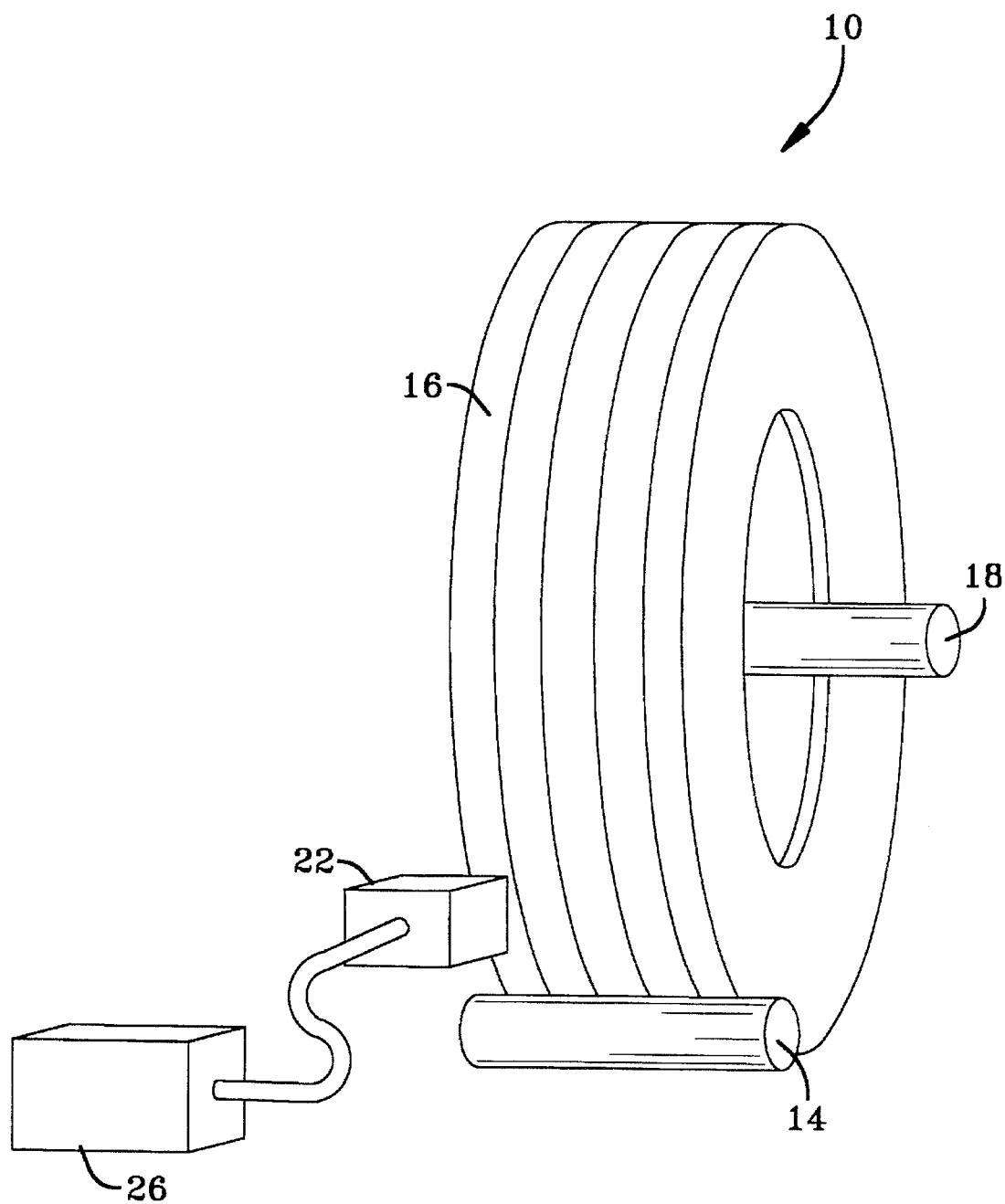
FIG. 1 shows a schematic representation of a tire force machine.

Referring now to the drawings, which are for purposes of illustrating a preferred embodiment of the invention only, and not for purposes of limiting the invention, FIG. 1 shows a schematic of a force machine 10 used to measure the lateral and radial forces generated by tire non-uniformity. A load wheel 14 applies a load to the tire 16 that is rotated by a drive wheel 18. Gauges 22 measure the lateral, tangential, and radial forces exerted by the tire 16. Lateral forces occur perpendicular to the plane in which the tire 16 rotates. Tangential forces act tangentially to the tire's footprint. Radial forces act parallel to a radius of the tire 16. The measurements are made electronically by the force machine 10 in volts and converted to a force measurement by the following equation, herein known as "Equation 1":

$$\text{force}_i = \text{force(volts)}_i / 0.020$$

where "force(volts)$_i$" is the electronic force measurement measured in terms of volts by the force machine 10, and "force$_i$" is the force measurement converted to pounds. Uniformity data is then preferably transferred to a computer 26 for analysis.

Figure 2:
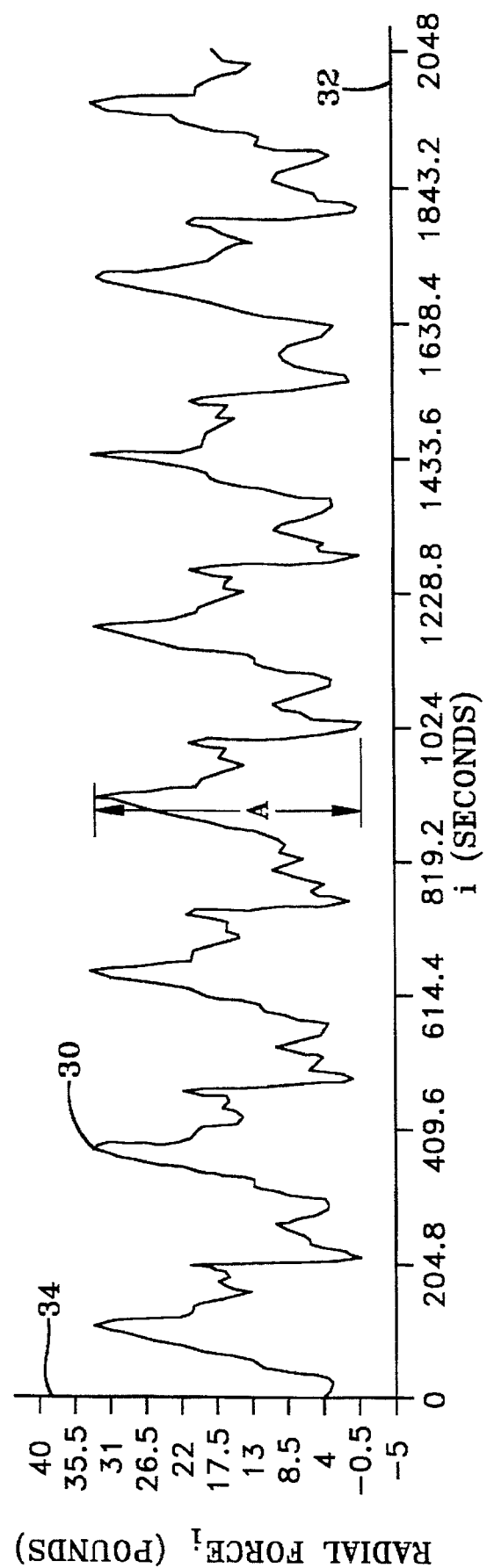
FIG. 2 shows a graph of a typical tire force variation of a tire.

FIG. 2 shows a graph of a waveform 30 of a radial force variation as measured by a force machine. Graphs of lateral force variations or tangential force variations (not shown) are derived in the same manner as the graphs of the radial force variations and are therefore not illustrated here to avoid the redundancy. The peak-to-peak, or amplitude "A" of the waveform is the difference of the maximum and minimum forces in one revolution of the waveform 30. On the graph, the x-axis 32 denotes "time" and the y-axis 34 denotes "radial force".

Figure 3:
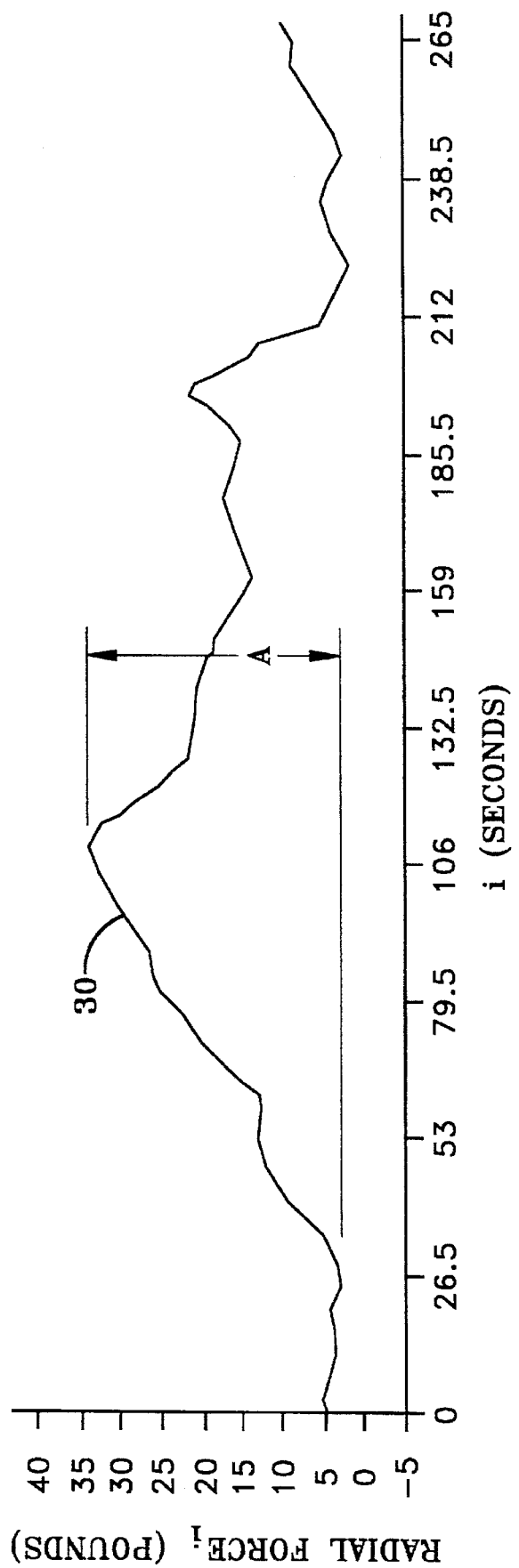
FIG. 3 shows a graph of a typical tire force variation through one revolution of the tire referred to in FIG. 2.

FIG. 3 shows an expanded view of the waveform 30 of one revolution of a tire. The amplitude of the waveform is shown by the measurement A.

Figure 4:
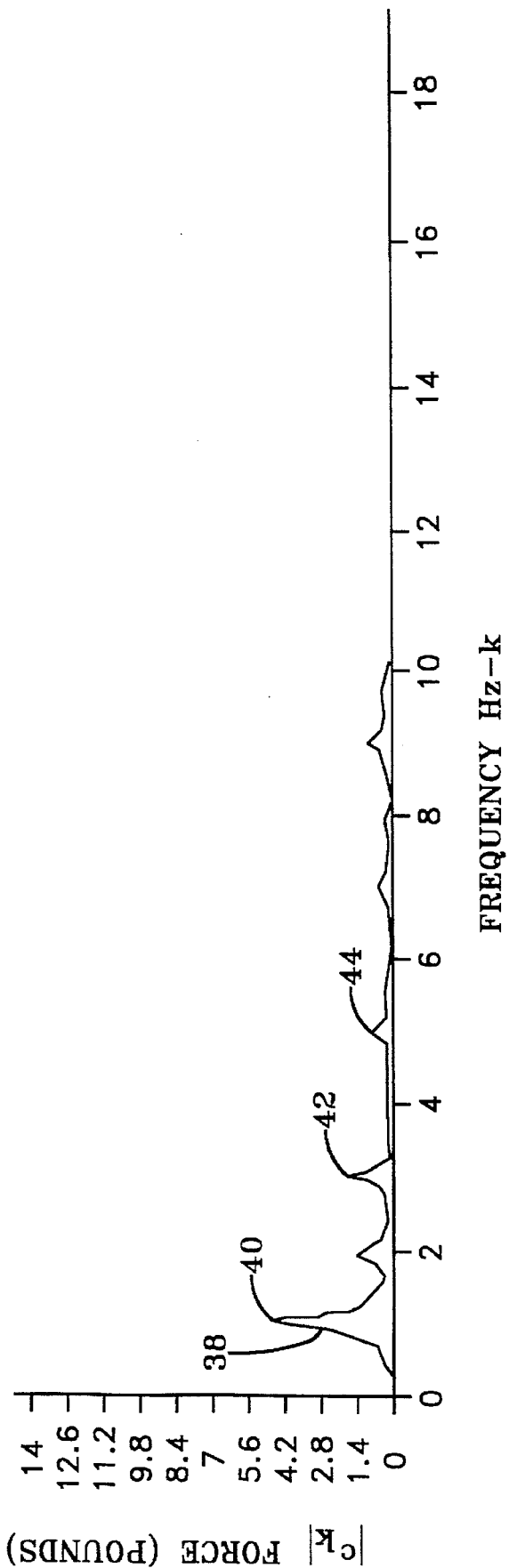
FIG. 4 shows a graph of the force variation frequency spectrum of the tire referred to in FIG. 2.

FIG. 4 shows a frequency spectrum graph 38, which reveals the harmonics of the tire. The frequency content of the radial force is calculated by measuring the number of force measurements recorded per rotation. A force variation that occurs once per rotation of the tire is denoted the "first harmonic." Similarly, a force variation that occurs twice per revolution of the tire is denoted the "second harmonic," and so on. The frequency spectrum graph 38 shows a first harmonic 40, third harmonic 42, and a fifth harmonic 44 on the particular tire (not shown) in the example.

Figure 5:
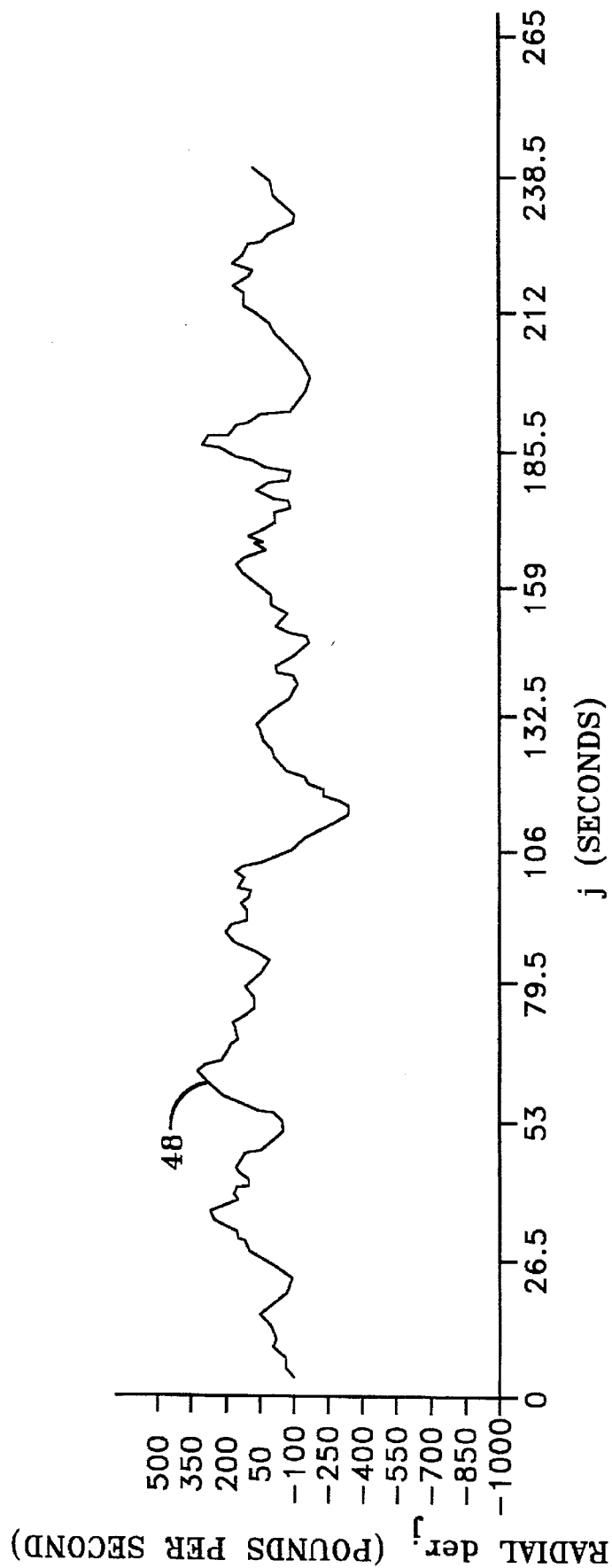
FIG. 5 shows a graph of the first derivative of the force variation waveform of the tire referred to in FIG. 2; and, FIG. 6 shows a graph of the first derivative frequency spectrum of the tire referred to in FIG. 2.

FIG. 5 shows the graph of the first derivative 48 of the waveform. The first derivative is calculated by a point-to-point method using the following equation, herein known as "Equation 2":

$$\text{radial der}_j = (\text{radial force}_{j+1} - \text{radial force}_j)/\text{delta T}$$

in which "radial der$_j$" refers to the derivative of the radial force waveform at a variable point j, and "radial force$_{j+1}$ - radial force$_j$" refers to the incremental difference between the waveform value at a variable point j+1 and the variable point j. In an actual application, the value "delta T" was 0.0035 seconds and represents the increment between force samples. The first derivative of radial force is then graphed point by point. The computer, or a human technician, may then reject a tire whose waveform has a peak-to-peak amplitude within the specifications appropriate for that tire, but which has a first derivative of radial force that reveals unacceptable rates of changes in force variations. The second derivative is also graphed (not shown) after being calculated using the following equation, herein referred to as "Equation 3":

$$\text{radial 2dder}_j = (\text{radial der}_{j+1} - \text{radial der}_j)/0.0035$$

in which "radial 2dder$_j$" refers to the second derivative of the waveformat a the variable point "j", and "(radial der$_{j+1}$ - radial der$_j$)" refers to the incremental difference between the first derivative of the waveformat the variable point "j+1" and the variable point "j". The second derivative enables the computer or human technician to reject a tire whose waveform exhibits unacceptably fluctuating rates of change of the first derivative, which also may cause unacceptable riding performance.

Existing force machines may be used to make the measurements required for uniformity analysis, with only minor changes required for the gathering and analysis of the data. Such changes would include providing for the calculation and graphing of the first and second derivatives. Once tire non-uniformity is detected, or the derivatives of the particular force variation in question are found to be outside the range of the original equipment specifications, the offending tire may then be pulled from the production line. Tires which are outside of the specification range may be ground for the non-uniformity. Changes in the production process may then be implemented to correct the non-uniformities.

Figure 6:
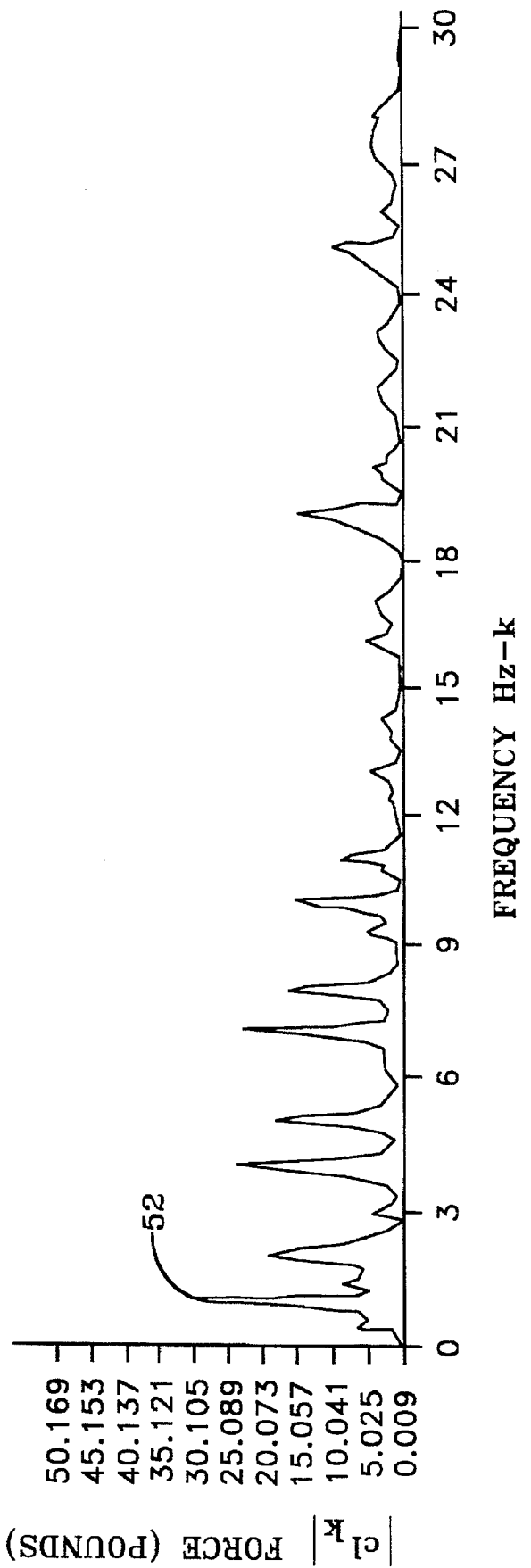

FIG. 6 shows a graph of the frequency spectrum of the first derivative 52 of the waveform. The first derivative frequency spectrum 52 enhances tire anomalies such as tread splices, ply splices, mold non-uniformities, mold runout, and tread pattern effects that are difficult to distinguish in the frequency spectrum of the waveform (see FIG. 4).

The radial and lateral forces of the tire 16 and the derivatives of the waveforms 30 may be analyzed to determine maximum rates of change to compare the greatest tire force fluctuations to original equipment specifications. The derivatives may also be analyzed to determine the root mean squares to compare the force data to original equipment specifications.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A method for analyzing tire uniformity using a force machine, said method comprising the steps of:

measuring radial forces of a tire;

generating a radial waveform from measurements of the radial forces of the tire;

calculating a first derivative of the radial waveform to obtain rate of change data between consecutive measurements of radial forces; and, comparing the rate of change data of radial forces to predetermined specifications.

2. The method of claim 1 further comprising the step of:

calculating a second derivative of the radial waveform to obtain data about the first derivative of the radial waveform; and, comparing the data about the first derivative of the radial waveform to predetermined specifications.

3. The method of claim 2 further comprising the steps of:

measuring lateral forces of the tire;

generating a lateral waveform from measurements of the lateral forces of the tire; and, calculating a first derivative of the lateral waveform to obtain rate of change data between consecutive measurements of lateral forces; and, comparing the rate of change data of lateral forces to predetermined specifications.

4. The method of claim 3 further comprising the step of:

calculating a second derivative of the lateral waveform to obtain data about the first derivative of the lateral waveform; and, comparing the data about the first derivative of the lateral waveform to predetermined specifications.

5. The method of claim 2 wherein the first and second derivatives are calculated using point-to-point slope calculations.

6. The method of claim 2 further comprising the step of removing the tire from sale when the second derivative of the radial waveform does not fall within said predetermined specifications.

7. The method of claim 3 further comprising the step of removing the tire from sale when the first derivative of the lateral waveform does not fall within said predetermined specifications.

8. The method of claim 4 further comprising the step of removing the tire from sale when the second derivative of the lateral waveform does not fall within said predetermined specifications.

9. The method of claim 4 wherein the radial and lateral waveforms are represented as force-time functions, and wherein the method further comprises the steps of:

representing the first derivative of the radial waveform in terms of pounds force per second;

representing the second derivative of the radial waveform in terms of pounds force per square seconds;

representing the first derivative of the lateral waveform in terms of pounds force per second; and, representing the second derivative of the lateral waveform in terms of pounds force per square seconds.

10. The method of claim 4 wherein the radial and lateral waveforms are represented as frequency spectrums.

11. The method of claim 1 further comprising the steps of:
determining a maximum value of the first derivative; and,
comparing the maximum value with predetermined specifications.

12. The method of claim 1 further comprising the steps of:
determining a root mean square of the rate of change data; and,
comparing the root mean square with predetermined specifications.

13. The method of claim 2 further comprising the steps of:
measuring tangential forces of the tire;
generating a tangential waveform from measurements of the tangential forces of the tire;
calculating a first derivative of the tangential waveform to obtain rate of change data between consecutive measurements of tangential forces;
calculating a second derivative of the tangential waveform to obtain data about the first derivative of the tangential waveform;
comparing the rate of change data of tangential forces to predetermined specifications;
comparing the data about the first derivative of the tangential waveform of the tangential waveform to predetermined specifications;
removing the tire from sale when the first derivative of the tangential waveform does not fall within said predetermined specifications; and,
removing the tire from sale when the second derivative of the tangential waveform does not fall within said predetermined specifications.

14. A method for analyzing tire uniformity using a force machine, said method comprising the steps of:
measuring lateral forces of the tire;
generating a lateral waveform from measurements of the lateral forces of the tire;
calculating a first derivative of the lateral waveform to obtain rate of change data between consecutive measurements of the lateral forces;
comparing the rate of change data of lateral forces to predetermined specifications;
calculating a second derivative of the lateral waveform to obtain data about the first derivative; and,
comparing the data about the first derivative to predetermined specifications.

15. The method of claim 14 wherein the first and second derivatives are calculated using point-to-point slope calculations.

16. The method of claim 14 further comprising the steps of:
measuring tangential forces of the tire;
generating a tangential waveform from measurements of the tangential forces of the tire;
calculating a first derivative of the tangential waveform to obtain rate of change data between consecutive measurements of the tangential forces;
calculating a second derivative of the tangential waveform to obtain data about the first derivative of the tangential waveform;
comparing the rate of change data of the tangential waveform to predetermined specifications;
comparing the data about the first derivative of the tangential waveform to predetermined specifications;
removing the tire from sale when the first derivative of the tangential waveform does not fall within said predetermined specifications; and,
removing the tire from sale when the second derivative of the tangential waveform does not fall within said predetermined specifications.

17. The method of claim 16 wherein the lateral and tangential waveforms are represented as force-time functions, and wherein the method further comprises the steps of:

determining the maximum value of the first derivative of the lateral waveform in terms of pounds force per second;

determining the maximum value of the second derivative of the lateral waveform in terms of pounds force per square seconds;

determining a maximum value of the first derivative of the tangential waveform in terms of pounds force per second; and, determining a maximum value of the second derivative of the tangential waveform in terms of pounds force per square seconds.

18. The method of claim 16 wherein the lateral and tangential waveforms are represented as frequency spectrums.

19. The method of claim 14 further comprising the steps of:
determining a maximum value of the first derivative of the lateral waveform; and,
comparing the maximum value with predetermined specifications.

20. The method of claim 14 further comprising the steps of:
determining a root mean square of the rate of change data of the lateral forces; and,
comparing the root mean square with predetermined specifications.

21. The method of claim 16 further comprising the steps of:
determining a maximum value of the first derivative of the tangential waveform; and,
comparing the maximum value with predetermined specifications.

22. The method of claim 16 further comprising the steps of:
determining a root mean square of the rate of change data of the tangential forces; and,
comparing the root mean square with predetermined specifications.

* * * * *